Jan. 19, 1926.  1,570,544

F. E. ZINN

MOVABLE HEADLIGHT

Filed Dec. 13, 1924    2 Sheets-Sheet 1

F. E. Zinn
INVENTOR

BY Victor J. Evans
ATTORNEY

WITNESS:

Jan. 19, 1926. 1,570,544
F. E. ZINN
MOVABLE HEADLIGHT
Filed Dec. 13, 1924 2 Sheets-Sheet 2
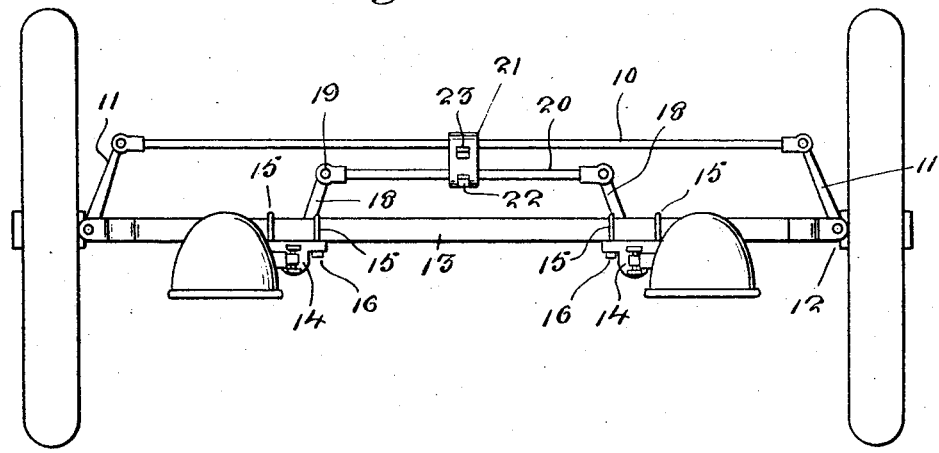
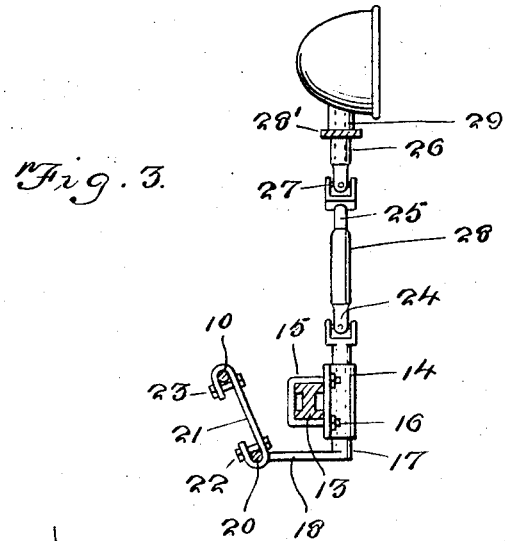
F. E. Zinn
INVENTOR Patented Jan. 19, 1926.

1,570,544

UNITED STATES PATENT OFFICE.

FRANK EDWARD ZINN, OF HARTFORD, CONNECTICUT.

MOVABLE HEADLIGHT.

Application filed December 13, 1924. Serial No. 755,731.

*To all whom it may concern:*

Be it known that I, FRANK E. ZINN, a citizen of the United States, residing at Hartford, in the county of Hartford and State of Connecticut, have invented new and useful Improvements in Movable Headlights, of which the following is a specification.

This invention relates to improvements in movable headlights and contemplates a provision of means whereby upon the turning of the wheel the headlamps will also turn in the path of travel taken by the vehicle upon the turning of the wheel.

A further object of the present invention is the provision of means whereby upon the side sway of the radius rod, the lamps will be turned in the opposite direction in the path of travel with the wheels.

With the above and other objects in view, the invention further includes the following novel features and details of construction to be hereinafter more fully described, illustrated in the accompanying drawings, and pointed out in the appended claims.

In the drawings:

Figure 2 is a top plan view of the lamp and mechanism therefor.

Figure 3 is a transverse section taken on line 3—3 of Figure 1.

Figure 1:
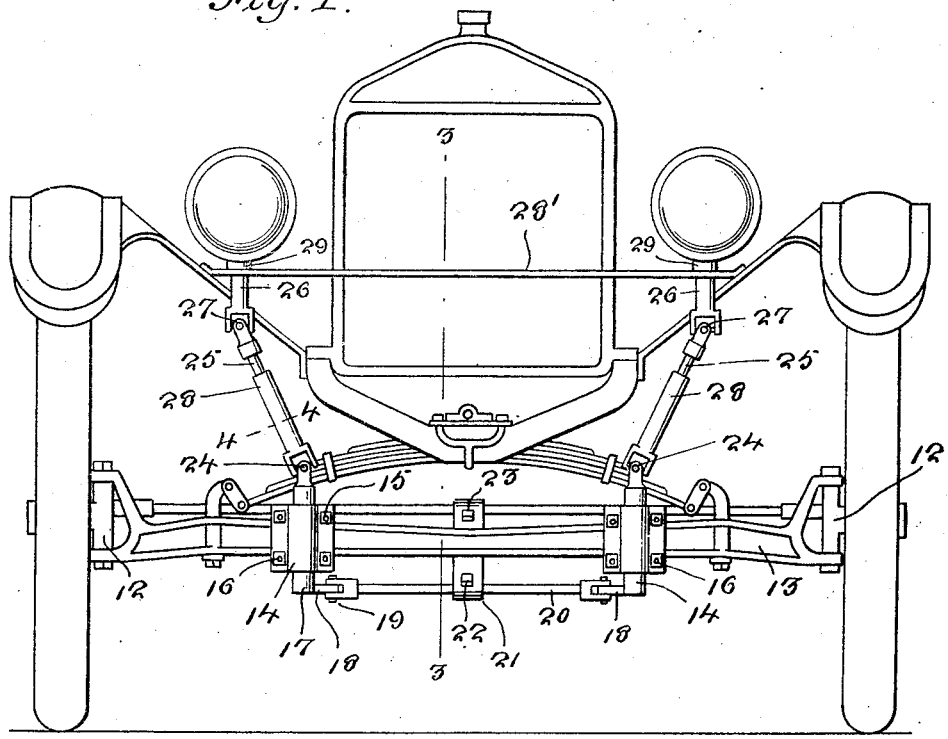
Figure 1 is a front elevation showing the invention applied.
Figure 4:
Figure 4 is a sectional view taken on line 4—4 of Figure 1, showing the lamp turning means.

Referring to the drawings in detail wherein like characters of reference denote corresponding parts, the reference character 10 indicates the cross rods of an automobile which is connected to the usual spindle arms 11 which are connected to the spindles 12, all of which are supported by an axle 13. The rod is of the usual and wellknown type.

In the present invention, the operating means comprises the movable headlamps and includes a pair of bearing castings which are rigidly secured to the axle 13 and in spaced relation to the center thereof and are indicated as at 14. Such bearing castings have bolts 15 which surround the axle and are secured to the bearing castings as at 16.

Journaled within the bearing castings 14 are the enlarged portions 17 which are adapted to freely rotate within the bearing castings 14 and have their rearward inwardly extending short legs 18 secured in the usual and wellknown manner as indicated at 19, by a cross rod 20. In order to facilitate rotation of the enlarged portion 17 within the bearing castings 14 there is connected intermediate of the length of the cross rod 20 and referring in detail more especially to Figure 3 of the drawings, a hook like member 21 which has its lower hook portion secured to the cross rod by suitable fastening means 22, the upper end of the hook like member 21 being secured to the radius rod 10 in a similar manner to that of the connection with the cross rod 20 and is held thereon by similar fastening means 23.

It will now be seen that upon turning of the wheel that the rod 10 will move transversely of the vehicle in an opposite direction to the turning of the wheels and that owing to the connection of the hook like member 21 thereto at its upper end and the connection with the cross rod at its lower end which are connected to the arms 18 will cause the arms to rotate within the bearings 14 in the same direction in which the wheels are turned.

In order to facilitate the partial rotation of the headlamps through the medium of the foregoing the telescopic sections are connected to the upper portion of the arms 18 as shown at 24 which is in the form of a universal joint comprising a cylindrical recess member which receives the rod 25 secured to the lamp post 26 as at 27 by a similar universal joint. The short recessed cylindrical member is indicated generally at 28. The lamp post 26 extends to the fenders of the vehicle and in order to provide a guide and slot upon which the lamps may rotate there is provided upon and connected to the fender a transversely extending fender brace 28' which receives adjacent their connection to the fender the upper portions of the lamp post 26 thereto whereby the lamps may be supported and at the same time be allowed to rotate thereon whereby the light may be turned in the same direction with the wheels in their movement.

Bearings 29 are provided upon the lower portions of the lamps and lying flush with the upper sides of the fender brace in order to eliminate friction and allow the lamps to freely rotate thereon.

The invention is susceptible of various changes in its form, proportions and minor details of construction, and the right is herein reserved to make such changes as properly fall within the scope of the appended claims.

Having thus described the invention, I claim:

1. A moveable headlight attachment for use upon vehicles comprising a pair of spaced castings secured to the front axle of the vehicle, a pair of substantially L-shaped members having their long arms journaled within the bearing castings, a cross rod pivotally secured to the end of the short arms of the L-shaped members, a double hook like member connected intermediately of the radius rod and the cross rod, a pair of telescopic sections keyed together and having their lower ends universally joined to the ends of the long arm of the L-shaped member, said telescopic sections being universally joined to the lower ends of the lamp posts, and a brace rod extending transversely of and associated with the lamp brackets whereby the latter may be easily swung in the same path of movement with the motor vehicle wheels.

2. A moveable headlight attachment for use upon vehicles comprising a pair of spaced castings secured to the front axle of the vehicle and having vertically extending bores therein, a pair of substantially L-shaped members having long enlarged arms journaled within the bearing castings, a cross rod pivotally secured to the inner end portions of the short arms of the L-shaped members, a double hook-like member connected intermediate the ends of the vehicle radius rod and cross rod respectively, the enlarged vertically extending portions of the L-shaped members being bifurcated and pivotally receiving within the upper end portions thereof the lower ends of a pair of keyed telescopic sections, a cross bar extending transversely of the vehicle and connected to the fender, a pair of lamps having standards extending from the lower portions thereof to the cross rod and journaled upon the upper sides thereof, and the upper end portions of the keyed telescopic section and the lower end portions of the lamp standards providing a universal joint whereby the said lamps may swing at any desired angle.

In testimony whereof I affix my signature.

FRANK EDWARD ZINN.